United States Patent [19]

Imaino

[11] Patent Number: 5,936,805
[45] Date of Patent: Aug. 10, 1999

[54] DISK DRIVE WITH SECONDARY VCM ACTUATOR

[75] Inventor: Wayne Isami Imaino, San Jose, Calif.

[73] Assignee: International Business Machines Corporation, Armonk, N.Y.

[21] Appl. No.: 08/989,245

[22] Filed: Dec. 12, 1997

[51] Int. Cl.$^6$ .................................. G11B 5/55; G11B 5/56
[52] U.S. Cl. ............................................ 360/104; 360/109
[58] Field of Search .................................. 360/78.05, 104, 360/106, 107, 109

[56] References Cited

U.S. PATENT DOCUMENTS

| | | | |
|---|---|---|---|
| 4,814,908 | 3/1989 | Schmitz | 360/109 |
| 5,177,652 | 1/1993 | Yamaguchi et al. | 360/78.05 |
| 5,189,578 | 2/1993 | Mori et al. | 360/106 |
| 5,216,559 | 6/1993 | Springer | 360/106 |
| 5,303,105 | 4/1994 | Jorgenson | 360/106 |
| 5,521,778 | 5/1996 | Boutaghou et al. | 360/106 |
| 5,657,188 | 8/1997 | Jurgenson et al. | 360/106 |
| 5,745,319 | 4/1998 | Takekado et al. | 360/78.05 |
| 5,781,381 | 7/1998 | Koganezawa et al. | 360/106 |
| 5,796,558 | 8/1998 | Hanraham et al. | 360/106 |

FOREIGN PATENT DOCUMENTS

| 6-12635 | 1/1994 | Japan . |
|---|---|---|
| 7-201148 | 8/1995 | Japan . |

OTHER PUBLICATIONS

Koshida, S.; *Head Access Mechanism*; IBM Technical Disclosure Bulletin; vol. 31; No. 2; Jul. 1988; pp. 220–221.
Koganezawa, S. et al.; *A Flexural Piggyback Milli–Actuator for Over 5 Gbit/in.2 Density Magnetic Recording*; IEEE Trans. Magn..; vol. 32; pp. 3908–3910; 1996.

Tang et al, IEEE Trans. on Magnetics, "Silicon Micromachined Electromagnetic Microactuators . . .", vol. 31, No. 6, pp. 2964–2966, Nov. 1995.

*Primary Examiner*—David L. Ometz
*Attorney, Agent, or Firm*—Lumen Intellectual Property Services

[57] ABSTRACT

An active mount plate having a secondary electromagnetic (voice coil motor, VCM) actuator controls the fine positioning of a magnetic read/write head relative to a magnetic disk. The active mount plate is a laminate structure comprising spring layer(s) and magnet-carrier layer(s). A spring connects a fixed part controlled by a primary VCM to a movable part for mounting top and bottom suspensions and slider/head assemblies. In one embodiment, a coil mounted on a steel coil carrier is sandwiched between permanent magnets mounted on polycarbonate spring supports. The permanent magnets are fixed, while the coil is attached to the movable part. In another embodiment, a movable permanent magnet mounted on a spring is sandwiched between top and bottom fixed coils. The centers of mass of the suspension/slider/head assemblies coincide with the attachment points of the suspensions, such that the primary and secondary actuators act independently. The laminate layers can be easily made by extrusion, molding or die-cutting.

22 Claims, 5 Drawing Sheets

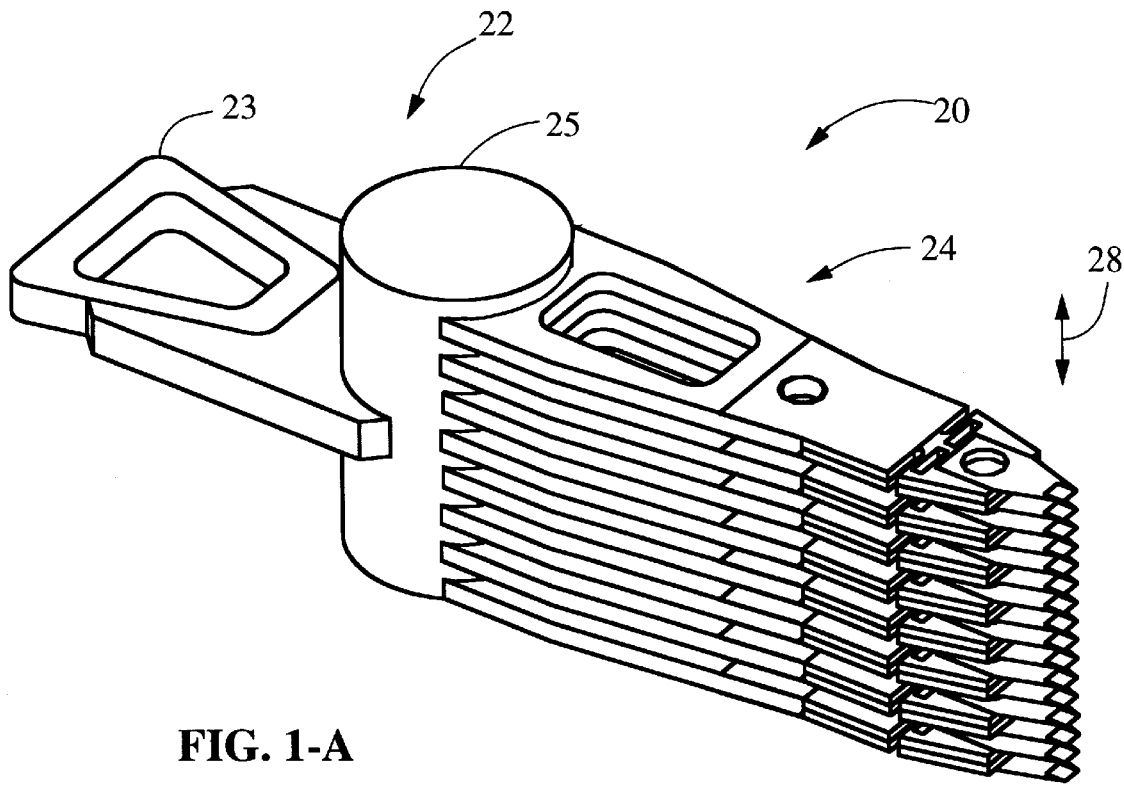
FIG. 1-A
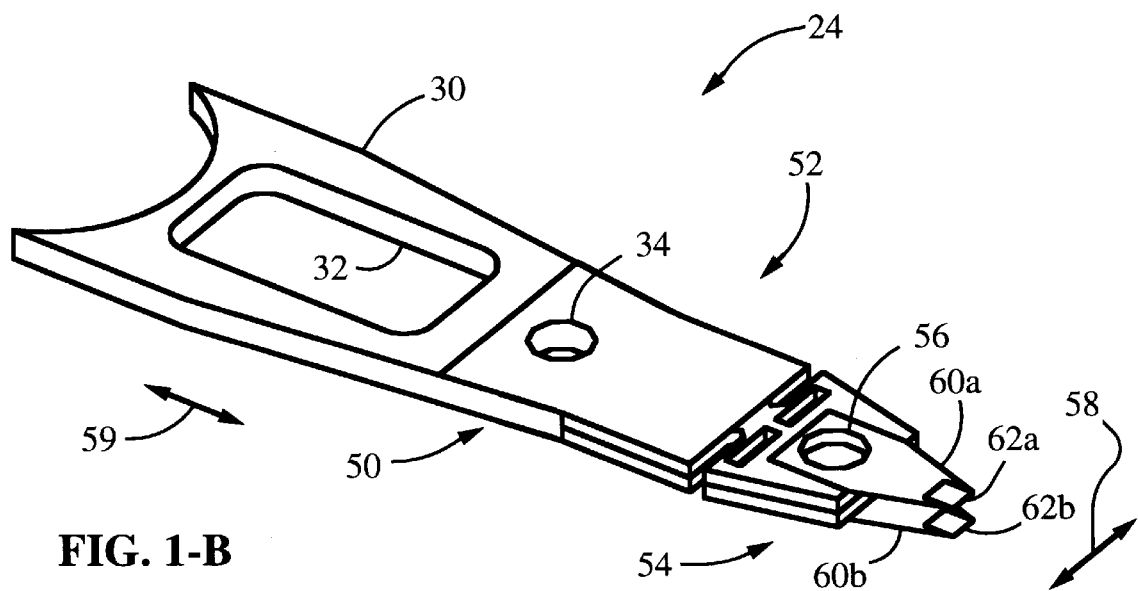
FIG. 1-B

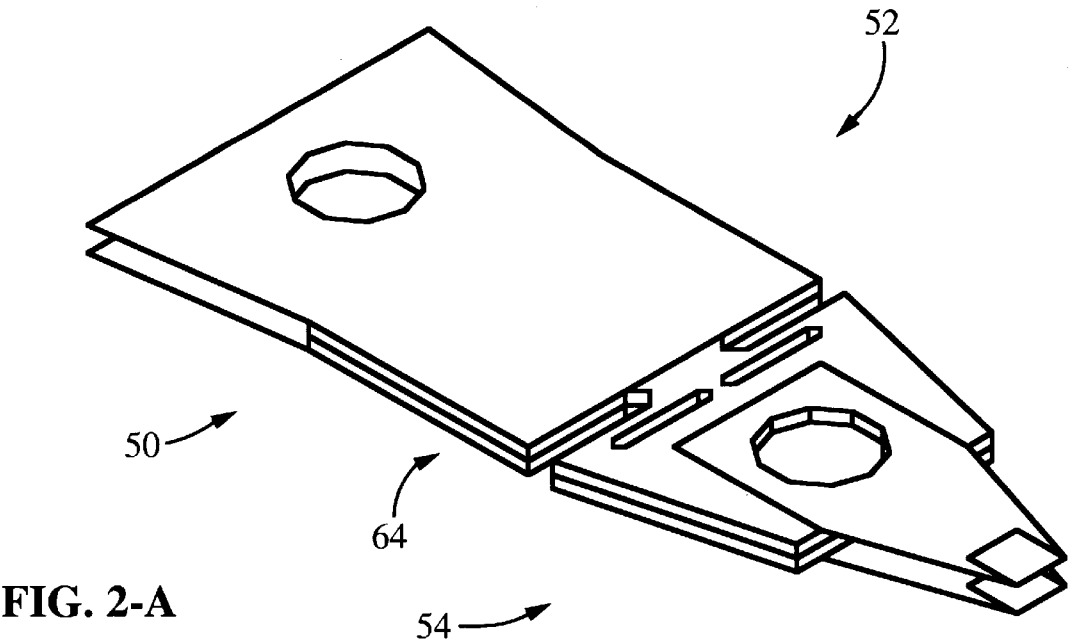
FIG. 2-A
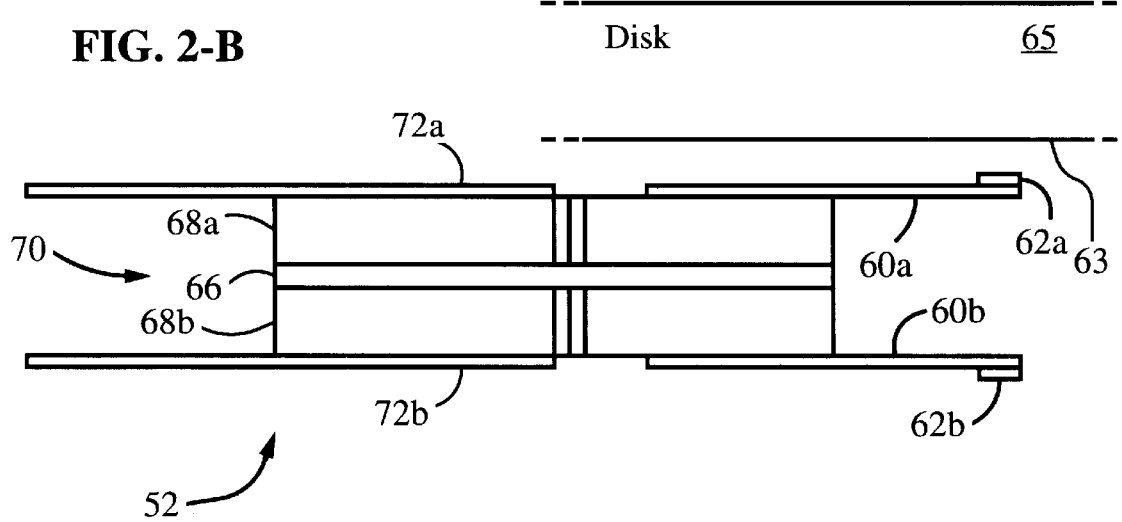
FIG. 2-B

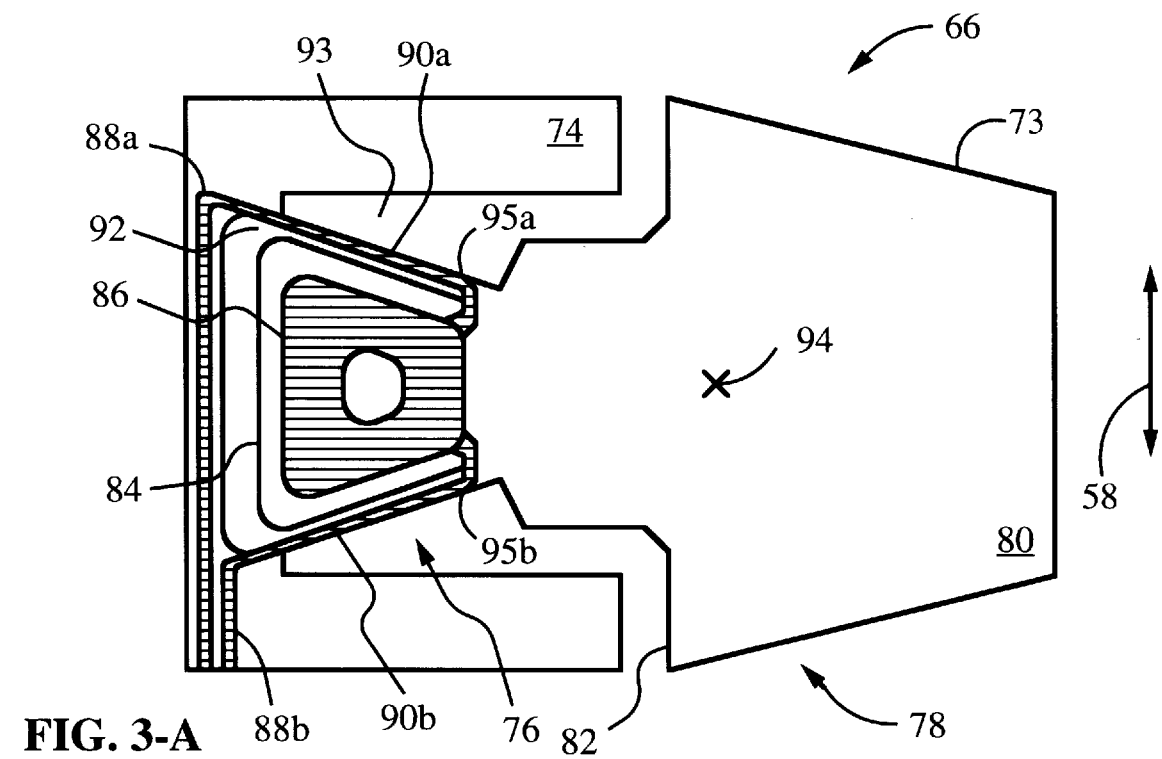
FIG. 3-A
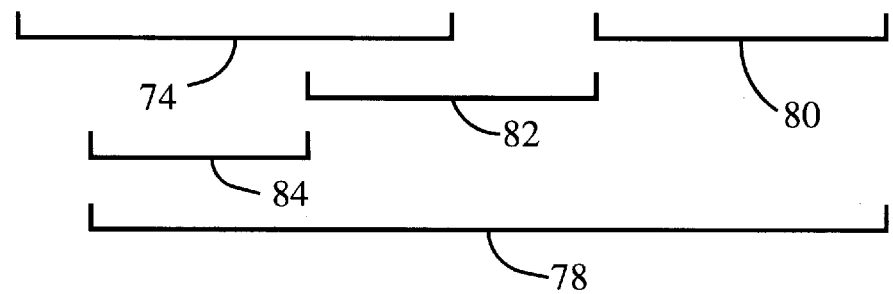
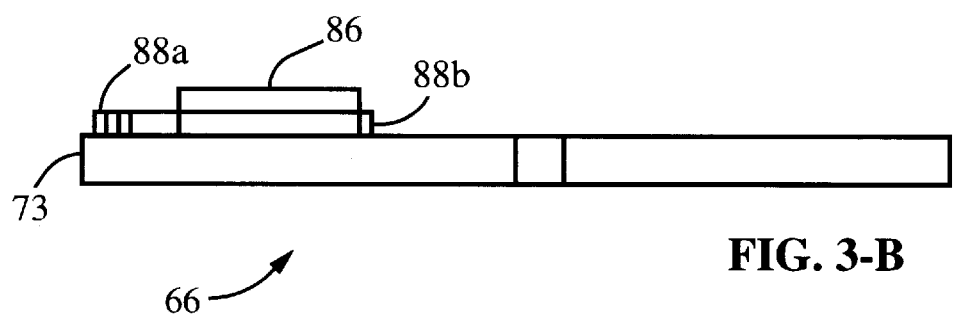
FIG. 3-B

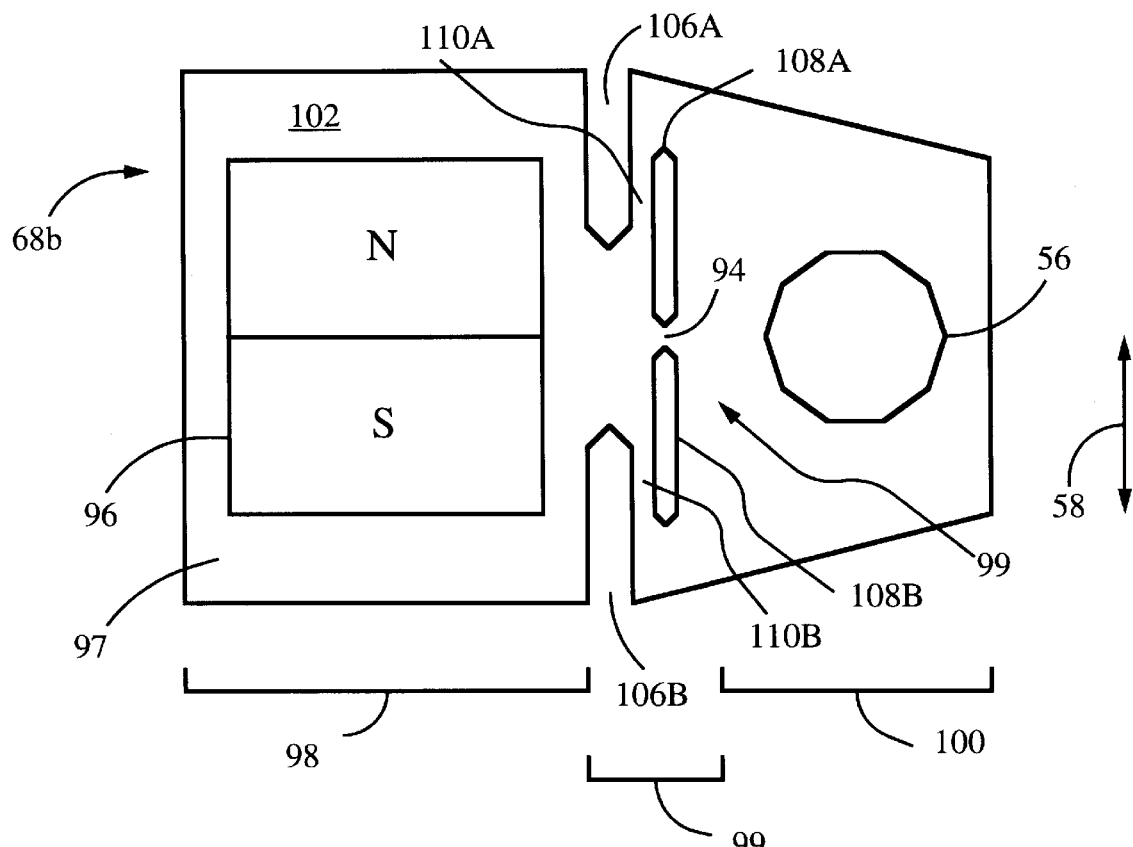
FIG. 4-A
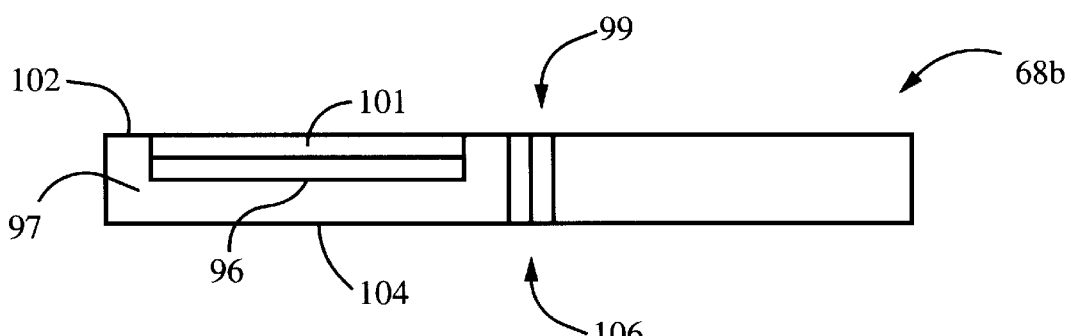
FIG. 4-B

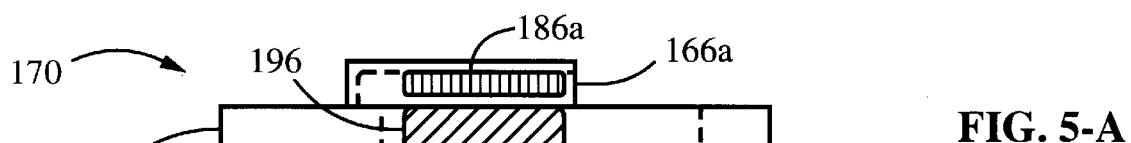
FIG. 5-A
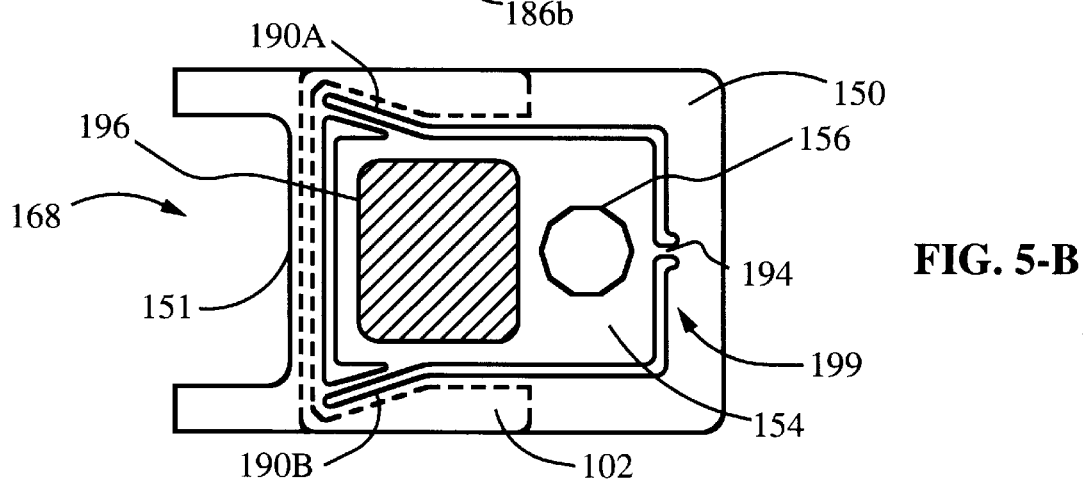
FIG. 5-B
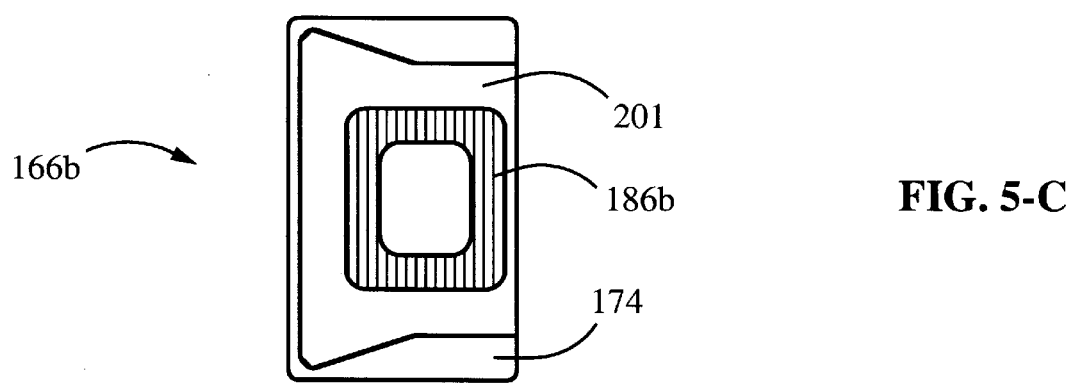
FIG. 5-C
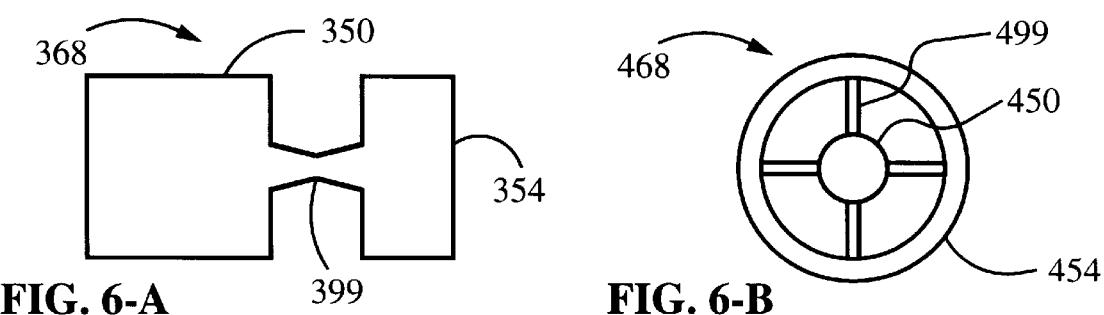
FIG. 6-A   FIG. 6-B

DISK DRIVE WITH SECONDARY VCM ACTUATOR

FIELD OF THE INVENTION

The present invention relates to the field of magnetic recording, and in particular to a disk drive arm assembly having a secondary voice coil motor (VCM) actuator for fine-tuning the motion of the read/write head.

BACKGROUND OF THE INVENTION

As the storage densities in magnetic recording media increase, the read/write magnetic heads must be positioned on the desired tracks with increasing accuracy. Secondary (piggyback) microactuators have been proposed for increasing the tracking accuracy and speed for magnetic recording heads.

U.S. Pat. Nos. 5,521,778, 5,189,578, 5,177,652, and 4,858,040, as well as the article by Koshida in *IBM Technical Disclosure Bulletin* 31(2):220–221 (1988), describe various arm assemblies comprising piezo-electric secondary actuators. While such actuators may be used for finely positioning magnetic heads, piezo-electric elements generally have low reliability and require higher voltages than used in conventional disk drives.

An article by Koganezawa et al. in *IEEE Trans. Magn.* 32(5):3908–3910 (1996) describes a flexural piggyback electromagnetic actuator. A flexural cross-shaped spring connects a movable head mounting block to a fixed rigid arm. The head and suspension assembly is mounted on the head mounting block. A coil on the head mounting block is magnetically coupled to a permanent magnet on the rigid arm. The spring used by Koganezawa et al. is a high-aspect ratio, thin stainless steel structure, which is relatively difficult to manufacture.

In U.S. Pat. No. 5,657,188, Jurgenson et al. disclose a disk drive suspension having an electromagnetic actuator. Two coils mounted on the suspension generate a magnetic field in the plane of the suspension (the tracking plane). The magnetic field is applied to a movable pole connected to the suspension tip, to change the orientation of the suspension tip. The Jurgenson et al. system provides a relatively small surface area for the magnetic coupling between the coil and the movable pole, and consequently relatively limited actuating forces and range of motion. Moreover, adding a microactuator within the suspension may negatively affect system performance, which is in general limited primarily by suspension dynamics.

OBJECTS AND ADVANTAGES OF THE INVENTION

Accordingly, it is a primary object of this invention to provide an arm assembly having a secondary electromagnetic actuator that is not part of the suspension, such that the secondary actuator does not constrain suspension performance; a separate secondary actuator allows the use of a conventional suspension. It is another object of the invention to provide a microactuator geometry suitable for generating large actuating forces, by providing an increased area for magnetic coupling. It is another object to provide an arm assembly that is easily manufacturable by conventional low-cost techniques such as extrusion, molding, and die-cutting. It is yet another object to provide a secondary actuator controlling two suspension/head assemblies simultaneously.

SUMMARY OF THE INVENTION

A magnetic recording disk drive comprises a magnetic recording disk having a recording surface, a magnetic read/write head and associated slider for accessing the recording surface, a rotary primary actuator for controlling the coarse positioning of the head relative to the recording surface, and a voice coil motor electromagnetic secondary actuator for controlling the fine positioning of the head relative to the recording surface.

The secondary actuator is a laminate active mount plate comprising plural stacked spring layer(s) and magnet-carrier layer(s). A rigid arm connects the active mount plate to the primary actuator. A spring layer comprises a first magnetic element mounted on a spring support. A magnet-carrier layer comprises a second magnetic element mounted on a carrier. The magnetic elements can be permanent magnets or current carrying structures such as coils. At least one of the magnetic elements of the active mount plate is a current-carrying structure capable of a dynamically-controllable magnetic interaction with magnetic elements of other layers. The spring support is preferably made of a plastic such as polycarbonate. The carrier is preferably made from a metal, for example from a thin sheet of a magnetically non-permeable stainless steel. Top and bottom magnetically permeable cover layers are stacked onto the spring and magnet-carrier layers, defining the top and bottom surfaces of the active mount plate, and preferably providing for swaged attachment of the active mount plate to the rigid arm of the primary actuator.

The spring support has a fixed part, a movable part, and a spring linking the movable part and the fixed part. The fixed and movable parts of the spring support define respective fixed and movable parts of the active mount plate. The fixed part is attached to the rigid arm. Top and bottom flexible suspension are mounted on top and bottom sides of the movable part. Magnetically coupled magnetic elements in different layers are attached respectively to the fixed and movable parts, such that the magnetic coupling between the magnetic elements drives the movable part relative to the fixed part, in the plane of the spring and magnet-carrier layers (the laminate plane). The magnetic coupling determines the fine tracking positioning of the magnetic head.

In a preferred arrangement, a first magnetic element (part of a spring layer) is attached to the fixed part, while a second magnetic element (part of a magnet-carrier layer) is attached to the movable part. A magnet-carrier layer is stacked between top and bottom spring layers. The spring layers define in tandem the fixed and movable parts, as well as the spring connecting the fixed and movable parts. The fixed part is situated proximally with respect to the rigid member, while the movable part is situated distally. The magnet-carrier layer comprises a movable actuating section having a proximal magnet-support part and a distal attachment part. The second magnetic element is mounted on the magnet support part, while the attachment part is laminated to the movable part of the spring support.

In an alternative arrangement, a first magnetic element is attached to the movable part, while a second magnetic element is attached to the fixed part. Top and bottom magnet-carrier layers are stacked on opposite sides of a spring layer. The spring layer comprises a permanent magnet and a spring support. The permanent magnet is mounted on the movable part of the spring support. The top and bottom magnet-carrier layers comprise respectively top and bottom coils, as well as top and bottom carriers. The top and bottom coils are mounted respectively on the top and bottom carriers, and are located on opposite sides of the permanent magnet. The spring comprises an attachment point connecting the movable and fixed parts, and defining a rotation point of the spring. Substantially longitudinally-oriented strips link opposite lateral sides of the movable part to the fixed part. The strips are spaced from the attachment point along the longitudinal direction of the active mount plate. The strips serve to confine the rotation of the spring in the plane of the spring layer.

DESCRIPTION OF THE FIGURES

FIG. 1-A shows a perspective view of a disk drive assembly of the present invention.

FIG. 1-B shows a perspective view of an arm assembly of the present invention.

FIG. 2-A shows a perspective view of an active mount plate of the present invention.

FIG. 2-B illustrates in a side view the active mount plate of FIG. 2-A.

FIG. 3-A shows a top view of a magnet-carrier layer of the active mount plate of FIG. 2-A.

FIG. 3-B shows a side view of the magnet-carrier layer of FIG. 3-A.

FIG. 4-A shows a top view of a spring spacer layer of the active mount plate of FIG. 2-A.

FIG. 4-B shows a side view of the spring spacer layer of FIG. 4-A.

FIG. 5-A illustrates in a side view an alternative geometry for spring and magnet-carrier layers of the present invention, designed such that the center of mass of the suspension attached to the active mount plate coincides with the rotational point of the spring.

FIG. 5-B shows a top view of the spring layer of FIG. 5-A.

FIG. 5-C illustrates in a top view a magnet-carrier layer of FIG. 5-A.

FIG. 6-A shows a top view of an alternative thin-hinge spring geometry for the present invention.

FIG. 6-B shows a top view of a alternative cross-shaped spring geometry for the present invention.

DETAILED DESCRIPTION

The term "magnetic element" is understood to refer to a permanent magnet or a current-carrying structure such as a coil. A magnetic element is capable of interacting with and/or producing a magnetic field, to generate a dynamically-controllable force as a result of magnetic coupling to another magnetic element.

FIG. 1-A shows a perspective view of a disk drive assembly 20 of the present invention. A primary actuator 22 is connected to a plurality of stacked rotary arm assemblies 24. Each arm assembly 24 accesses two recording surfaces of a magnetic disk stack (not shown). Actuator 22 is capable of rotating arm assemblies 24 relative to the disk stack, in a plane orthogonal to an axis of rotation 28 of the disk stack. Actuator 22 controls a coarse tracking positioning of arm assemblies 24 relative to their respective disks. Actuator 22 comprises a coil 23 and a magnet assembly (not shown) of a primary voice coil motor (VCM), and a connecting hub 25 for connecting coil 23 and arm assemblies 24.

FIG. 1-B shows a perspective view of an arm assembly 24. Arm assembly 24 comprises a rigid arm or member 30 connected to actuator 22. Rigid member 30 has a central aperture 32 allowing a reduction in the mass of rigid arm 30. A proximal fixed part 50 of an active mount plate 52 is fixedly attached to a distal end of rigid member 30, opposite its attachment to actuator 22. An attachment aperture 34 defined in rigid member 30 and active mount plate 52 allows swaging active mount plate 52 to rigid member 30. In general, active mount plate 52 and rigid member 30 may be glued or attached by any other suitable means.

A distal movable part 54 of active mount plate 52 is capable of motion relative to fixed part 50, along an actuating direction 58 parallel to the surfaces of disks. Actuating direction 58 is generally perpendicular to a longitudinal direction 59 of arm assembly 24. Two independent, flexible suspensions 60a–b are attached to movable part 54 on opposite (top and bottom) sides of active mount plate 52. An attachment aperture 56 defined in movable part 54 and suspensions 60a–b allows swaging suspensions 60a–b to movable part 54. Suspensions 60a–b are conventional Watrous-type suspensions. For general information on Watrous suspensions see for example U.S. Pat. No. 4,167,765. Sliders and read/write magnetic head assemblies 62a–b are mounted respectively on suspensions 60a–b, facing recording surfaces on different disks. Assemblies 62a–b are conventional. Suspensions 60a–b provide biasing forces pressing sliders/heads 62a–b toward their respective recording surfaces, for holding the magnetic heads near the recording surfaces.

FIGS. 2-A and 2-B show perspective and side views, respectively, of active mount plate 52 and attached suspensions 60a–b and sliders/heads 62a–b. Dimensions in the vertical direction are exaggerated in FIG. 2-B for clarity. Suspension 60a provides a biasing force pressing slider/head 62a toward a recording surface 63 of a disk 65, as illustrated in FIG. 2-B.

Active mount plate 52 comprises a plurality of laminate layers 64. Layers 64 are stacked along a direction parallel to the axis of rotation 28 of the magnetic disks (perpendicular to the plane defined by actuating direction 58 and longitudinal direction 59). A magnet-carrier layer 66 is sandwiched between top and bottom spring spacer layers 68a–b; layers 66 and 68a–b define an actuating structure 70 of plate 52. Actuating structure 70 is sandwiched between top and bottom cover layers 72a–b along fixed part 50. Cover layers 72a–b are sheets of a magnetically permeable material such as a magnetically soft stainless steel, for confining magnetic flux within active mount plate 52. Cover layers 72a–b also provide mechanical support to active mount plate 52, and their attachment apertures serve to attach active mount 52 plate to rigid member 30. The use of multiple laminate layers greatly simplifies the manufacture of an active mount plate of the present invention, as discussed below.

FIGS. 3-A and 3-B show top and side views, respectively, of magnet-carrier layer 66. The brackets underneath the structure of FIG. 3-A illustrate the longitudinal extents of various components. Magnet-carrier layer 66 comprises a thin, stiff carrier 73 made of a magnetically non-permeable stiff metal such as a non-permeable stainless steel. Carrier 73 has a proximal attachment section 74 for vertical attachment to respective proximal sections of spacer layers 68a–b (see below); proximal attachment section 74 is included in fixed part 50.

Attachment section 74 is horizontally movably linked through a linking structure 76 to a movable actuating section 78 of carrier 73. Actuating section 78 comprises a distal attachment part 80 for vertical attachment to respective distal sections of spring layers 68a–b; distal attachment part 80 is included in movable part 54. Actuating section 78 also comprises a free (vertically unattached) middle part 82 and a free magnet support part 84. A multiple-turn copper coil (electromagnet) 86 is laminated to carrier 73 along free magnet support part 84. Support part 84 is coated with a thin insulating film, to prevent shorting of the wires of coil 86.

The turns of coil 86 lie in the plane of layer 66. Two copper leads 88*a–b* are also laminated to carrier 73 over a thin insulating film on attachment section 74, linking structure 76, and magnet support part 84. Leads 88*a–b* provide for electrical communication between coil 86 and outside servo electronics (not shown).

Linking structure 76 preferably comprises two generally longitudinal, thin strips 90a-b on opposite lateral sides of coil 86. Strips 90*a–b* are linked to attachment section 74 proximally relative to coil 86, and to actuating section 78 distally relative to coil 86. Strips 90*a–b* serve to confine the motion of actuating section 78 to the lateral direction 58, in the plane of layer 66. Lateral gaps 92, 93 are defined respectively between strips 90*a–b* and actuating section 78, and between strips 90*a–b* and proximal attachment section 74, for accommodating the lateral tracking motion of actuating section 78 with respect to proximal attachment section 74.

Actuating section 78 is free to pivot in-plane about a rotation point 94 in response to the application of lateral magnetic force on coil 86 with respect to proximal attachment section 74, causing motion of distal attachment part 80 along lateral direction 58. Rotation point 94 is defined by the spring structure of active mount plate 52, as described below. Strips 90 deform at bending points 95*a–b* to allow the rotation of actuating section 78. Lateral gaps 92, 93 have a width on the order of hundreds of microns to millimeters, while the lateral range of motion of actuating section 78 is on the order of microns to tens of microns.

FIGS. 4-A and 4-B show top and side views, respectively, of bottom spring spacer layer 68*b*. Spring layer 68*b* comprises a permanent magnet 96 mounted on a spring support 97, facing coil 86. Spring support 97 is preferably a monolithic block made of a plastic such as polycarbonate, or another material amenable to extrusion or injection molding. The material of spring support 97 has a high fatigue stress, and a Young's modulus preferably on the order of GPa.

Spring support 97 has a fixed proximal part 98 fixedly attached to arm 30, and a movable distal part 100 capable of lateral in-plane motion relative to fixed part 98. A spring 99 links parts 98 and 100, and together with the corresponding spring of top spring layer 68*a* forms the spring structure of active mount plate 52, which determines the rotation/flexural properties of active mount plate 52. Spring 99 is defined by lateral cuts 106A–B on opposite lateral sides of spring layer 68*a*, and transverse apertures 108A–B adjacent respectively to lateral cuts 106A–B. Cut 106A is longitudinally aligned to cut 106B, while aperture 108A is longitudinally aligned to aperture 108B. Cuts 106A–B and apertures 108A–B define a rotation point 94 of spring 99, and thin bending sections 110A–B allowing the in-plane movement of movable part 100 relative to fixed part 98. The stress at bending sections 110A–B is preferably much lower than the yield stress of the material of spring support 97.

Fixed part 98 comprises a vertical attachment area 102 and a magnet support area 104. Proximal section 98 is vertically attached (e.g. glued) along vertical attachment area 102 to attachment section 74 of carrier 73. Magnet 96 is fixedly attached to magnet support area 104. Magnet support area 104 is thinner than vertical attachment area 102, as illustrated in FIG. 4-B, defining a space for magnet 96 and allowing for a small vertical gap 101 between magnet 96 and coil 86. Magnet 96 is a permanent magnet polarized along actuating direction 58 (laterally-polarized). The corresponding magnet of layer 68*a* is polarized opposite to magnet 96 so as to confine the magnetic flux generated by the magnets within active mount plate 52, in particular for minimizing undesired magnetic fields at the magnetic heads and recording surfaces.

The magnetic coupling between coil 86 and permanent magnet 96 drives movable part 54 relative to fixed part 50. In turn, the displacement of movable part 54 relative to fixed part 50 determines the fine tracking positioning of slider/head 62*b*. A vertical component of a magnetic field produced by magnet 96 interacts with the current passing through coil 86 in a generally longitudinal direction to generate a lateral force on coil 86, along actuating direction 58. Actuating section 78, which has a much higher in-plane stiffness than spring 99, transmits the force applied on coil 86 to movable part 54. The motion of movable part 54 is constrained to the lateral direction, in the laminate plane. The tracking accuracy of active mount plate 52 is preferably on the order of 0.1 $\mu$m, while the full range of motion is on the order of 1 $\mu$m.

The various layers of active mount plate 52 are amenable to large-scale manufacture using low-cost processes such as die-cutting, photo-etching, as well as stamping and forming processes commonly employed in precision sheet metal manufacturing. Preferably, the metal magnet-carrier layers are substantially but not completely die-cut or stamped from a large sheet. The plastic spring layers are extruded, or alternatively injection-molded, and then glued or otherwise attached in a stacked manner to the magnet-carrier layers to form the laminate structure of active mount plate 52.

The use of plastic for the spring structure of active mount plate 52, in conjunction with the use of multiple laminate layers, simplifies the manufacture of the spring and active mount plate. A very stiff material such as steel would require the spring layer to be very thin; at the same time, constraining the spring motion to the tracking plane generally requires the spring to have a high aspect ratio. Making complex, thin, high-aspect-ratio metal parts is relatively difficult. By contrast, the use of relatively soft material such as plastic for the spring allows the use of a relatively thick spring layer, easily manufacturable by extrusion or molding.

FIG. 5-A illustrates in a side view an alternative geometry for an actuating structure 170 of the present invention. Vertical dimensions are exaggerated in FIG. 5-A, for clarity. FIGS. 5-B and 5-C show respectively top views of the spring and magnet-carrier layers of the actuating structure of FIG. 5-A. Top and bottom magnet-carrier layers 166*a–b* are stacked on opposite (top and bottom) sides of a spring layer 168. Spring layer 168 comprises a fixed part 150, a movable part 154, and a spring 199 linking parts 150 and 154. Parts 150 and 154 define the respective fixed and movable parts of the active mount plate. Fixed part 150 is attached at its proximal end 151 to a rigid member (not shown). A permanent magnet 196 is mounted on movable part 154. Top and bottom coils 186*a–b* are attached through layers 166*a–b* to fixed part 150, and are situated on opposite sides of permanent magnet 196. Coils 186*a–b* drive the tracking displacement of movable part 154 relative to fixed part 150. Bottom magnet-carrier layer 166*b* has a raised attachment section 174 vertically attached to an attachment section 102 of spring layer 168. Attachment section 174 is raised, defining a space 201 for accommodating coil 186*b*.

Spring 199 is defined by a distal attachment point 194 connecting parts 150 and 154. Attachment point 194 defines the rotation flexural point of spring 199. An attachment aperture 156 for a suspension is situated relative to point 194 such that the center of mass of the suspension, with the slider and head mounted thereon, substantially coincides with point 194. Then, accelerations caused by the primary VCM actuator do not produce a torque about point 194 for the suspension, and thus do not affect the displacement of spring 199. Substantially longitudinal proximal strips 190A–B link opposite lateral sides of movable part 154 to fixed part 150. Strips 190A–B confine the rotation of spring 199 to the plane defined by spring layer 168.

FIGS. 6-A and 6-B show top views of alternative spring geometries of the present invention, respectively a thin-hinge geometry and a cross-shaped geometry. A thin-hinge spring 368 comprises a movable part 354 connected to a fixed part 350 through a thin single-hinge spring 399. A crossed-shape 468 has a circular outer movable part 454 connected to a central fixed part 450 through spokes 499 arranged in a cross.

It will be clear to one skilled in the art that the above embodiments may be altered in many ways without departing from the scope of the invention. For example, the distinction between the rigid member and the primary actuator may be a formal one: the actuator hub and the rigid member may be part of a single monolithic (e.g. molded) piece. The distinction between the rigid member and part of the active mount plate (e.g. a fixed part of a spring layer) may also be a formal one: for example, parts of one or more layers of the active mount plate may be monolithically formed as one piece with the rigid member. More than two spring or magnet-carrier layers may be used. Various attachments can be suitable between the primary actuator and the active mount plate, between the various layers of the active mount plate, and between the active mount plate and the suspension. Moreover, various spring and magnet-carrier geometries may be used.

Various relative arrangements of stacked magnetic elements are suitable for the present invention. Coils and permanent magnets are interchangeable for force generation purposes; other considerations, such as the required actuator resonant frequency and ease of access to coils, may be weighed in a decision of whether to use a coil or a permanent magnet for a particular layer. Coils are generally lighter, but require access to outside circuitry. Consequently, it is preferred that coils be used for the movable part, so as to reduce the constraints imposed on the resonant frequency of the actuator, which is generally preferred to be higher than that of the suspensions. Coils may also be used instead of permanent magnets to generate magnetic fields acting on other coils.

Accordingly, the scope of the invention should be determined by the following claims and their legal equivalents.

What is claimed is:

1. An arm assembly for a rotary primary actuator in a magnetic recording disk drive, comprising:
    a) a rigid member for connection to said primary actuator;
    b) a laminate active mount plate attached to said rigid member, comprising:
        a spring layer comprising a spring support and a first magnetic element mounted on said spring support, said spring support having a fixed part and a movable part, said fixed part being attached to said rigid member, said movable part being linked to said fixed part through a spring, and
        a magnet-carrier layer stacked onto said spring layer, said magnet-carrier layer having a second magnetic element situated opposite said first magnetic element such that a magnetic coupling between said first magnetic element and said second magnetic element drives said movable part relative to said fixed part; and
    c) a first suspension mounted on the movable part for holding a magnetic head, such that said magnetic coupling determines a fine tracking position of said magnetic head;
wherein:
    a) said first magnetic element is attached to said fixed part; and
    b) said second magnetic element is attached to said movable part.

2. The arm assembly of claim 1 wherein:
    a) said first magnetic element comprises a permanent magnet; and
    b) said second magnetic element comprises a coil.

3. The arm assembly of claim 1 wherein:
    a) said first magnetic element comprises a coil; and
    b) said second magnetic element comprises a permanent magnet.

4. The arm assembly of claim 1 wherein:
    a) said magnet carrier-layer comprises a movable actuating section having a magnet-support part and an attachment part;
    b) said second magnetic element is mounted on said magnet-support part; and
    c) said attachment part is laminated to said movable part, whereby said second magnetic element is attached to said movable part.

5. The arm assembly of claim 1 further comprising a second suspension, said first and second suspensions being mounted respectively on top and bottom sides of said movable part.

6. The arm assembly of claim 1 wherein said spring support is formed of a plastic.

7. The arm assembly of claim 1 wherein said spring support is formed of a polycarbonate.

8. The arm assembly of claim 1 wherein said magnet-carrier layer comprises a metal sheet.

9. The arm assembly of claim 1 wherein said active mount plate further comprises top and bottom magnetically permeable cover layers stacked onto said spring layer and said magnet-carrier layer.

10. The arm assembly of claim 1 wherein a rotation point of said spring substantially coincides with a center of mass of an assembly of said first suspension and said magnetic head, such that a displacement of said movable part relative to said fixed part is substantially independent of an acceleration of said primary actuator.

11. An arm assembly for a rotary primary actuator in a magnetic recording disk drive, comprising:
    a) a rigid member for connection to said primary actuator;
    b) a mount plate attached to said rigid member, comprising:
        top and bottom spring layers comprising respectively top and bottom spring supports and top and bottom permanent magnets mounted respectively on said top and bottom spring supports, wherein said top and bottom spring layers define a fixed part attached to said rigid member, a movable part, and a spring linking said fixed part and said movable part, and wherein said top and bottom magnets are attached to said fixed part; and
        a magnet-carrier layer stacked between said top and bottom spring layers, said magnet-carrier layer comprising a carrier and a coil mounted on said carrier, said coil being located between said top and bottom permanent magnets and being magnetically coupled to said top and bottom permanent magnets, said coil being attached through said carrier to said movable part, whereby said coil drives said movable part relative to said fixed part in response to a magnetic coupling to said top and bottom permanent magnets; and c) top and bottom suspensions mounted on said movable part, for holding respectively top and bottom magnetic heads.

12. The arm assembly of claim 11 further comprising top and bottom cover layers stacked onto said top and bottom spring layers.

13. The arm assembly of claim 11 wherein said top and bottom spring supports are formed of a plastic.

14. The arm assembly of claim 11 wherein said carrier comprises a metal sheet.

15. The arm assembly of claim 11 wherein said spring is defined by longitudinally-aligned lateral cuts on opposite lateral sides of said top and bottom spring layers, and longitudinally-aligned transverse apertures adjacent to said lateral cuts, such that a rotation point of said spring is defined substantially between said transverse apertures.

16. An arm assembly for a rotary primary actuator in a magnetic recording disk drive, comprising:

a) a rigid member for connection to said primary actuator;

b) a mount plate attached to said rigid member, comprising:

a spring layer comprising a spring support and a permanent magnet mounted on said spring support, wherein said spring support defines a fixed part attached to said rigid member, a movable part, and a spring linking said fixed part and said movable part, and wherein said permanent magnet is mounted on said movable part; and top and bottom magnet-carrier layers stacked on opposite sides of said spring layer, and comprising respectively top and bottom carriers and top and bottom coils mounted respectively on said top and bottom carriers, said top and bottom coils being attached to said fixed part, said top and bottom coils being located on opposite sides of said permanent magnet and being magnetically coupled to said permanent magnet, whereby said top and bottom coils drive said movable part relative to said fixed part in response to a magnetic coupling to said permanent magnet; and c) top and bottom suspensions mounted on said movable part, for holding respectively top and bottom magnetic heads.

17. The arm assembly of claim 16 further comprising top and bottom cover layers stacked onto said top and bottom magnet-carrier layers.

18. The arm assembly of claim 16 wherein said spring support is formed of a plastic.

19. The arm assembly of claim 16 wherein each of said top and bottom carriers comprises a metal sheet.

20. The arm assembly of claim 16 wherein said spring comprises:

a) an attachment point connecting said movable part and said fixed part, and defining a rotation point of said spring; and b) substantially longitudinal strips spaced from said attachment point along a longitudinal direction, and linking opposite lateral sides of said movable part to said fixed part, for confining a rotation of said spring to a plane of said spring layer.

21. An active mount plate for an arm assembly connected to a rotary primary actuator in a magnetic recording disk drive, comprising:

a) top and bottom spring layers comprising respectively top and bottom spring supports and top and bottom permanent magnets mounted respectively on the top and bottom spring supports, wherein the top and bottom spring layers define a fixed part for attachment to the primary actuator, a movable part, and a spring linking the fixed part and the movable part, and wherein the top and bottom magnets are attached to the fixed part; and b) a magnet-carrier layer stacked between the top and bottom spring layers, the magnet-carrier layer comprising a carrier and a coil mounted on the carrier, the coil being located between the top and bottom permanent magnets and being magnetically coupled to the top and bottom permanent magnets, the coil being attached through the carrier to the movable part, whereby the coil drives the movable part relative to the fixed part in response to a magnetic coupling to the top and bottom permanent magnets.

22. A magnetic recording disk drive comprising:

a) a magnetic recording disk having a recording surface;

b) a magnetic head;

c) a rotary primary actuator for controlling a coarse positioning of the magnetic head relative to the recording surface;

d) a rigid arm connected to the primary actuator;

e) a secondary electromagnetic actuator connected to the rigid arm, for controlling a fine positioning of the magnetic head relative to the recording surface, the secondary actuator comprising:

top and bottom spring layers comprising respectively top and bottom spring supports and top and bottom permanent magnets mounted respectively on the top and bottom spring supports, wherein the top and bottom spring layers define a fixed part attached to the rigid arm, a movable part, and a spring linking the fixed part and the movable part, and wherein the top and bottom magnets are attached to the fixed part; and a magnet-carrier layer stacked between the top and bottom spring layers, the magnet-carrier layer comprising a carrier and a coil mounted on the carrier, the coil being located between the top and bottom permanent magnets and being magnetically coupled to the top and bottom permanent magnets, the coil being attached through the carrier to the movable part, whereby the coil drives the movable part relative to the fixed part in response to a magnetic coupling to the top and bottom permanent magnets;

f) a suspension mounted on the movable part, for holding the magnetic head near the recording surface.

* * * * *